United States Patent [19]

Block

[11] Patent Number: 4,529,029

[45] Date of Patent: Jul. 16, 1985

[54] PROCESS FOR MONITORING A CONTINUOUS CASTING MOLD IN OPERATION

[75] Inventor: Franz-Rudolf Block, Roetgen, Fed. Rep. of Germany

[73] Assignee: Arbed S.A., Luxembourg

[21] Appl. No.: 434,280

[22] Filed: Oct. 14, 1982

[30] Foreign Application Priority Data

Oct. 16, 1981 [LU] Luxembourg ............... 83699

[51] Int. Cl.³ .................. G01F 23/28; B22D 11/06
[52] U.S. Cl. .................. 164/453; 164/454; 164/450
[58] Field of Search ............ 164/413, 449, 450, 453, 164/454, 451; 73/290 R, 304 R; 324/204

[56] References Cited

U.S. PATENT DOCUMENTS 3,456,715  7/1969  Freedman et al.
4,279,149  7/1981  Block ..................... 164/449

FOREIGN PATENT DOCUMENTS 25669   2/1977  Japan .................. 73/304 R
37469   3/1977  Japan .................. 73/304 R
143411  11/1980 Japan .................. 73/304 R Primary Examiner—Howard N. Goldberg
Assistant Examiner—Timothy V. Eley
Attorney, Agent, or Firm—Fishman & Dionne

[57] ABSTRACT

A process for monitoring continuous casting molds is presented. A primary coil coaxially surrounding the continuous casting mold is powered with currents whose Fourier analysis includes several frequencies. Several secondary coils are also arranged coaxially between the primary coil and the mold and surround the mold. The secondary coils are placed around the liquid metal pool level region, with the secondary coil in the lowest location being located beneath the pool surface at all times and serving as a reference coil. The differences between the Fourier components of the signals measured on the various secondary coils and the reference coil are taken, related to the intensities in the primary coil, and analyzed by magnitude or phase. By comparison of the various signals, the presence of liquid metal or slag, the temperature prevailing in the particular region of the mold wall, are determined.

13 Claims, No Drawings

PROCESS FOR MONITORING A CONTINUOUS CASTING MOLD IN OPERATION

BACKGROUND OF THE INVENTION

This invention relates to a process for monitoring a continuous casting mold in operation. More particularly this invention relates to a monitoring process for measuring the level of liquid metal, the thickness of the slag layer, and the thermal conditions within the mold wall.

In the operation of continuous casting molds, it is important to know the level of liquid metal in the mold. Knowledge of level of metal in the mold makes it possible to adjust an appropriate refill or an appropriate billet drawoff rate. Reliable and rapid measurement methods must be used for measuring the level of liquid metal filling the mold. The appropriate measurement devices must also be usable with closed systems under powder or under inert gas; and the measurement devices should be installed so that they do not interfere with or obstruct the inlet to the mold; and at the same time they must be protected themselves from exposure to and damage from the metal. Furthermore, such measuring devices should represent no sources of risk.

Processes are known in which the presence of liquid metal is deduced from the temperature of the mold wall. However, such processes are sluggish and costly. Optical processes are also known. However, their usefulness is limited when the pouring is done under powder or in closed systems. Measurement methods are also known in which radioactive substances are used. However, these systems are encountering increasingly strict licensing procedures.

It is generally known that currents are induced by changes of the magnetic fields penetrating a conductor, and that the presence of the conductor can be deduced from the secondary fields of these currents. A measurement method employing this concept is described in German Patent Application Disclosure 2,101,729. It is also known that the impedance of a coil changes when a conductor is placed in the field of the coil. Thus, in accordance with French Pat. No. 2,251,811, a contactless induction instrument can determine the position of the boundary between two phases which have different densities and resistivities, with at least one of the phases conducting the current being nonmagnetic. In that French Patent, the measuring instrument includes operating and measuring coils which are oriented towards the phase boundary in open arrangement.

However, these prior art measurement methods fail in the continuous casting of steel, since the highly conductive copper mold used in such casting screens the fields so strongly that the sensitivity of the known measuring devices is unsatisfactory. Furthermore, measuring devices which are located above the mold or on the top edge of the mold impair accessibility to the mold and can be destroyed by overflowing steel.

Luxembourg Patent Application No. 80,410 (assigned to the assignee hereof and the disclosure of which is incorporated herein by reference) describes how the effect of the copper mold can be eliminated by a field-producing primary coil and two identical secondary coils wired in opposition, together with the liquid metal, forming a system in which the position of the metal level can produce an induced voltage in the coils. As taught in that Luxembourg patent application, the primary coil and the secondary coils lie coaxially around the vessel; the voltage induced in the secondary coils on the basis of the position of the metal level, as well as the electrical conductivity of the metal, are measured; and the position of the metal level is determined from the voltage corrected for the measured conductivity. However, experience with this measurement method has shown that, with large wall thickness of the mold or in the case of a thick, hot covering of the steel pool by molding powder or slag, the measurement obtained is not the steel level but rather the slag level or a weighted value of the two. This occurs because the conductivity of the copper mold changes with temperature and the temperature is modified by contact with hot slag or powder. With thick molds, the measured signals can be influenced more strongly by the temperature-induced conductivity changes in the mold wall than by the presence of the liquid metal.

SUMMARY OF THE INVENTION

The general object of this invention is to provide a measurement method for the determination of the level of liquid metal, of the thickness of the slag layer, and of the thermal circumstances inside the mold wall in continuous casting molds, while meeting the requirements noted above and avoiding the drawbacks inherent in the prior procedures.

In accordance with the present invention, a primary coil coaxially surrounding the continuous casting mold is powered by periodic currents or pulses whose Fourier analysis contains several frequencies. The currents to the primary coil may be pules, square wave signals or other periodic waveforms. Several secondary coils are also arranged coaxially of the mold and between the primary coil and the mold and surround the mold. The secondary coil in the lowest position is located beneath the liquid metal pool level at all times, and serves as a reference coil, and the other secondary coils are placed at or about the desired pool level region and serve as measurement coils. The presence of liquid metal or slag, as well as the temperature prevailing in the particular region of the mold wall, are determined from the measurement of the voltages induced in the secondary coils after subtraction of the voltage measured in the reference coil.

It is a known fact that the higher the frequency of inducing current, the lower is the depth to which the magnetic inductions of the individual frequencies penetrate in a given situation. Low-frequency field components, therefore, penetrate more strongly through the copper mold than high-frequency components and induce stronger currents in the liquid metal within the mold, as measured from the currents induced in the mold. Therefore, the secondary voltages induced in a measurement coil which surrounds the mold at a suitable height, will, in accordance with the present invention, contain both information on the temperature in the mold wall and also the desired information on the liquid metal pool level. To obtain this information, use is made pursuant to the invention of a double-comparison measurement. Specifically, a reference coil is used which is positioned at such a low level around the mold that in normal operation the hot metal is always surrounded by the reference coil. One or more other measurement coils are preferably attached around the mold in the region of the possible liquid metal pool level fluctuations.

The reference voltage is subtracted from the voltage induced in a measurement coil. If the voltage differential is equal to zero, the same conditions prevail in the two coils consistent with the coils both surrounding liquid metal. If the differential is not equal to zero, then the level of the liquid metal conducting pool and the temperature in the mold wall can be deduced from its curve, i.e., from a comparison of the amplitudes and/or phases of the Fourier components of the induced signals. Since the temperature in the mold wall is affected by the contact with the hot media, i.e., steel and slag, the slag thickness can also be measured from the temperature differences of steel and slag.

The measuring system of this invention can be calibrated by carrying out another pool level measurement in parallel, for example by using an optical method, or by calculating the voltages induced with a given primary field and given conditions.

DESCRIPTION OF THE PREFERRED EMBODIMENT

The measurement process of the present invention is described by way of example set forth below. To facilitate explanation, a simple example is presented in which (a) the current in the primary coil surrounding the continuous casting mold contains only two harmonic oscillations with the two frequencies $w_1$ and $w_2$; and there are two secondary coils, one being a reference coil near the bottom of the mold and one being at the nominal or desired level of the top of the liquid metal pool.

In the example, $w_2$ is greater than $w_1$. Also, the phase displacement between $w_1$ and $w_2$ is chosen so that the phase displacement of the two oscillations induced in the reference coil is zero.

The voltage $V_R$ measured in the reference coil is therefore $$V_R = V_1 \cos w_1 t + V_2 \cos w_2 t$$

where $V_R$ is the reference coil voltage, $V_1$ and $V_2$ are the primary coil voltages for $w_1$ and $w_2$.

On the other hand, the voltage $V_M$ measured in the measurement coil is $$V_M = (V_1 + \Delta V_1) \cos(w_1 t + \phi_1) + (V_2 + \Delta V_2) \cos(w_2 t + \phi_2)$$

The signal therefore includes four items of information with only two frequencies; the change amplitudes and the phase shifts $\phi_1$ and $\phi_2$.

To permit better resolution of the information, the difference $(V_M - V_R)$ is considered;

$$V_M - V_R = (V_1 + \Delta V_1)[\cos w_1 t \cdot \cos\phi_1 - \sin w_1 t \cdot \sin\phi_1] +$$
$$(V_2 + \Delta V_2)[\cos w_2 t \cdot \cos\phi_2 - \sin w_2 t \cdot \sin\phi_2] -$$
$$V_1 \cos w_1 t - V_2 \cos w_2 t$$

For small phase shifts, it is approximately true that $\cos \phi_i = 1$ and $\sin \phi_i = \phi_i$.

If second-order terms in the equations are neglected, the preceding equation is simplified to:

$$V_M - V_R = \Delta V_1 \cdot \cos w_1 t - V_1 \cdot \sin w_1 t \cdot \sin\phi_1 +$$
$$\Delta V_2 \cdot \cos w_2 t - V_2 \sin w_2 t \cdot \sin\phi_2$$

All four terms can be measured individually by known and conventional methods.

If the higher frequency $w_2$ is high enough, $\Delta V_2$ also provides information concerning the conductivity changes in the copper wall caused by temperature.

The higher the temperature of a region of the mold wall, the smaller is the conductivity of that portion of the mold. Thus, the larger the temperature difference between the regions of the mold in the measuring and reference coils, the greater also in the value of $\Delta V_2$. That temperature difference will, of course, occur if the liquid metal level drops below the height of the upper measuring coil.

In accordance with the process of the present invention, the secondary voltage of the oscillator with the lower frequency $w_1$ is also affected by the mold temperature, since if this were not the case, i.e., if the effect of the liquid metal itself were the only factor, then the voltage of the low frequency itself could be used as information and neither a second voltage with a higher frequency nor a comparison with it would be necessary. There remains, however, the knowledge that at the lower frequency the effect of the metal pool is stronger.

It can be approximately assumed for small additional voltages that they are composed additively of the values for the metal pool and for the wall:

The following relationship is therefore true:

$$\Delta V_i = \Delta V_i B(H) + \Delta V_i K(T); \; i = 1,2.$$

In this relationship, H is the height of the metal level and T is a weighted average of the temperature of the mold in the measurement region, and thus a measure of the height L of the slag level. The function B refers to the pool, and the function K to the mold.

The function $\Delta V_i B(H)$ is considered to be known. For example, using cold material with the same conductivity such as a suitable austenitic steel, the characteristics $\Delta V_i B = \Delta V_i B(H)$ can be recorded.

The term T(L) is defined as the temperature T measured on the mold wall at level L of the slag. Temperature T is measured by any suitable means and the empirically established data are used to calibrate the instruments. The function $V_i K(L)$ indicates the variation of voltages Vi measured at the mold K and depending on the slag temperature at level L.

The value of $\Delta V_i K$ depends on the temperature curve (i.e., temperature versus height of the mold). To determine this curve, several secondary coils, one above the other, must be used. If, as usual, T(L) is known, then $\Delta V_i K(L)$ is also known.

From two measured values of $\Delta V_i$ and the above equation, H and L can be determined.

If the measuring device is used only to regulate the liquid metal pool level—which will be the usual case—then the differences $\Delta H = h$ and $\Delta L = l$ can be limited to small values.

It is then true that:

$$\Delta V_1 = \alpha 1 \cdot h + \beta 1 \cdot l \text{ and}$$

$$\Delta V_2 = \alpha 2 \cdot h + \beta 2 \cdot l \text{ from which}$$

$$h = \frac{\beta 2 \cdot \Delta V_1 - \beta 1 \cdot \Delta V_2}{\alpha 1 \cdot \beta 2 - \alpha 2 \cdot \beta 1} = k1 \cdot \Delta V_1 - k2 \cdot \Delta V_2 \text{ and}$$

$$l = \frac{\alpha 1 \cdot \Delta V_2 - \alpha 2 \cdot \Delta V_1}{\alpha 1 \cdot \beta 2 - \alpha 2 \cdot \beta 1} = k3 \cdot \Delta V_2 - k4 \cdot \Delta V_1 \text{ follows.}$$

The above simple computations can be carried out with known electronic units such as either by analog or digital computer operation. The constants ki can also be determined fromm simple and known tests.

By using several secondary coils, one above the other, the temperature variation in the wall can be monitored constantly, so that not only the height of the pool level can be determined, but also the height of the slag layer.

If the mold wall is so thick that is temperature distribution during the operation cannot be described precisely enough by a single FIGURE, then the mold is resolved in the model into two or more shells. An additional frequency must then be used for each shell.

Instead of or in addition to the voltage amplitudes, the phase shifts, which depend also on the conductivity distribution within the coils, can also be used for the measurements. The Fourier analysis of the secondary voltages can be dispensed with if the shape of the input signal is appropriately chosen, i.e., in the simplest case, if different frequencies in succession are chosen.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A process for monitoring a continuous casting mold to measure the level of liquid metal in the mold and the thickness of slag layer, including:
   delivering to a primary coil surrounding the mold exterior thereof currents whose Fourier analysis contains a plurality of frequencies;
   inducing signals in a plurality of secondary coils arranged coaxially around the mold exterior thereof, including at least one reference secondary coil in a region of the mold normally containing liquid metal, said reference secondary coil being responsive to said mold and said liquid metal, and at least one measuring secondary coil in the region of desired liquid metal level, said measuring secondary coil being responsive to said mold; and
   sensing and comparing signals induced in said secondary reference and measuring coils to sense the presence of liquid metal and slag.

2. The process of claim 1 wherein said step of sensing and comparing induced signals includes:
   sensing the Fourier component of the induced signals and comparing to signal intensity in the primary coil and analyzing with regard to magnitude or phase.

3. The process of claim 1 wherein:
   the signal to the primary coil contains two harmonic oscillations.

4. The process of claim 1 wherein:
   the signal to the primary coil is in the form of a periodic signal; and
   the presence of liquid metal or slag in the mold is determined by a comparison of the signals on the secondary coils.

5. The process of claim 1 wherein:
   the signal to the primary coil is harmonic currents of different frequencies.

6. A process for monitoring a continuous casting mold to measure the level of liquid metal in the mold, the thickness of slag layer, and thermal conditions in the mold wall including:
   delivering to a primary coil surrounding the mold currents whose Fourier analysis contains a plurality of frequencies;
   including signals in a plurality of secondary coils arranged coaxially around the mold, including at least one reference secondary coil in a region of the mold normally containing liquid metal, said reference secondary coil being responsive to said mold and said liquid metal, and at least one measuring secondary coil in the region of desired liquid metal level, said measuring secondary coil being responsive to said mold; and
   sensing and comparing signals induced in said secondary reference and measuring coils to sense the presence of liquid metal and slag and the temperature in portions of the mold wall associated with the measuring coil.

7. The process of claim 6 wherein said step of sensing and comparing induced signals includes:
   sensing the Fourier components of the induced signals and comparing to signal intensity in the primary coil and analyzing with regard to magnitude or phase.

8. The process of claim 6 wherein:
   the signal to the primary coil contains two harmonic oscillations.

9. The process of claim 6 wherein:
   the signal to the primary coil is in the form of a periodic signal; and
   the presence of liquid metal or slag in the mold and mold wall temperatures are determined by a comparison of the signals on the secondary coils.

10. The process of claim 6 including:
    determining the temperature profile of the mold wall from the amplitude and phase of high frequency Fourier components; and
    determining the level of liquid metal from the amplitude and phase of low frequency Fourier components.

11. The process of claim 6 wherein:
    the signal to the primary coil is harmonic currents of different frequencies.

12. A process for monitoring a continuous casting mold to measure the level of liquid metal in the mold, the thickness of slag layer, and thermal conditions in the mold wall including:
    delivering to a primary coil surrounding the mold currents whose Fourier analysis contains a plurality of frequencies;
    inducing signals in a plurality of secondary coils arranged coaxially around the mold, including at least one reference secondary coil in a region of the mold normally containing liquid metal and at least one measuring secondary coil in the region of desired liquid metal level;
    sensing and comparing signals induced in said secondary reference and measuring coils to sense the presence of liquid metal and slag and the temperature in portions of the mold wall associated with the measuring coil;
    wherein the signal to the primary coil is in the form of a periodic signal; and
    wherein the presence of liquid metal or slag in the mold and mold wall temperatures are determined by a comparison of Fourier components of the signals on the secondary coils.

13. A process for monitoring a continuous casting mold to measuring the level of liquid metal in the mold, the thickness of slag layer, and thermal conditions in the mold wall including:

delivering to a primary coil surrounding the mold currents whose Fourier analysis contains a plurality of frequencies;

inducing signals in a plurality of secondary coils arranged coaxially around the mold, including at least one reference secondary coil in a region of the mold normally containing liquid metal and at least one measuring secondary coil in the region of desired liquid metal level;

sensing and comparing signals induced in said secondary reference and measuring coils to sense the presence of liquid metal and slag and the temperature in portions of the mold wall associated with the measuring coil;

determining the temperature profile of the mold wall from the amplitude and phase of high frequency Fourier components; and determining the level of liquid metal from the amplitude and phase of low frequency Fourier components.

* * * * *